UNITED STATES PATENT OFFICE.

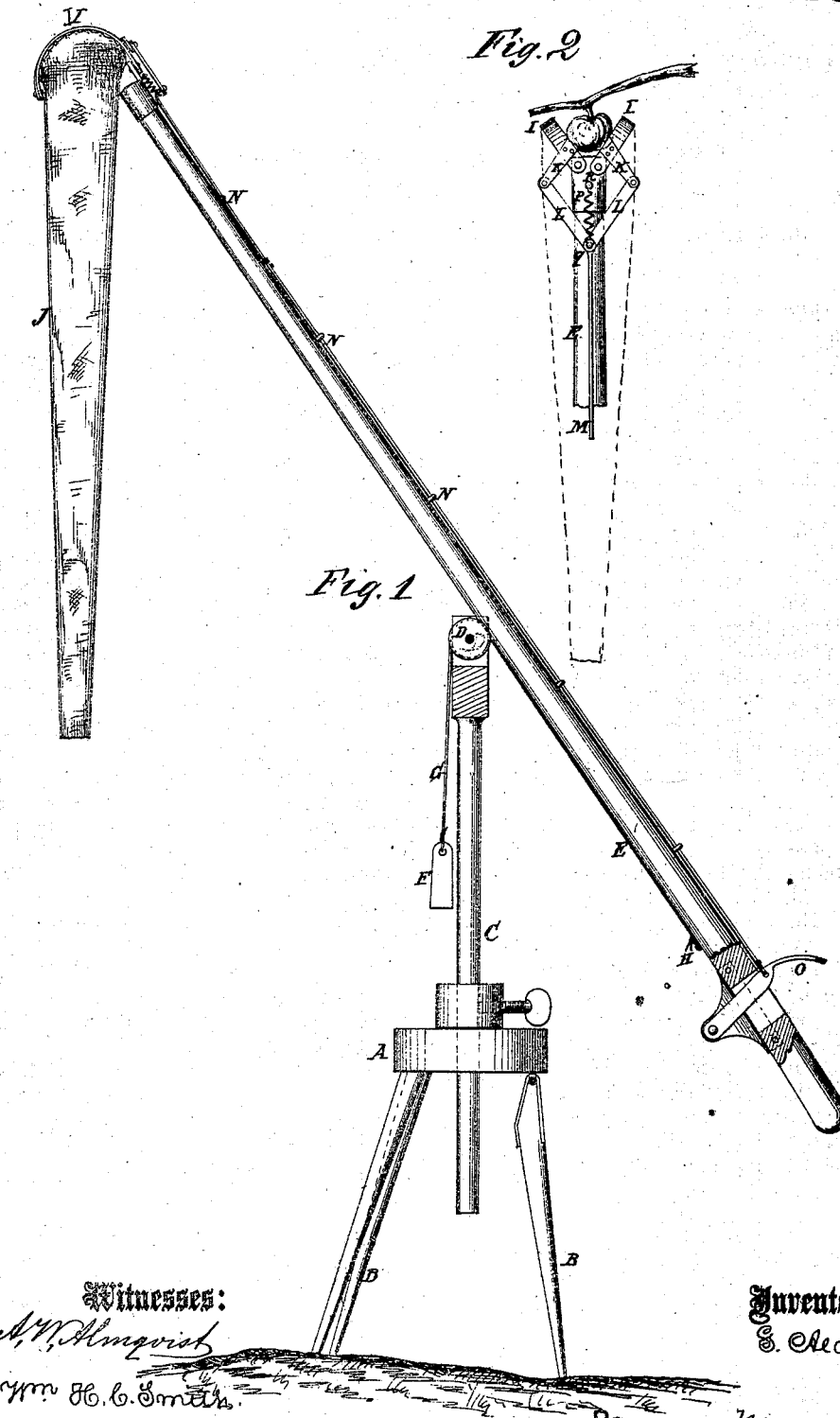

GEORGE ALDRIDGE, OF HENDERSON CITY, KENTUCKY.

IMPROVEMENT IN FRUIT-GATHERERS.

Specification forming part of Letters Patent No. 116,789, dated July 11, 1871.

*To all whom it may concern:*

Be it known that I, GEORGE ALDRIDGE, of Henderson city, in the county of Henderson and State of Kentucky, have invented a new and Improved Fruit-Gatherer; and I do hereby declare that the following is a full, clear, and exact description thereof, which will enable others skilled in the art to make and use the same, reference being had to the accompanying drawing forming part of this specification.

The object of this invention is to provide suitable and convenient means for picking fruit (as apples, peaches, &c.) from trees without climbing and without bruising the fruit; and it consists in the combination of an adjustable stand with a fruit-picker, as hereinafter described.

In the drawing, Figure 1 is an elevation of the entire apparatus. Fig. 2 is a detail, showing the jaws and the mode of their construction.

Similar letters of reference indicate corresponding parts.

A is a stand or table resting upon legs B, with a pivot-bar, C, passing through it, which bar is adjustable as to height and turns freely in the table or stand. The bar C has a pulley, D, in its top, on which the picking-staff rests. E is the picking-staff. F is a weight attached to a cord, G, which cord is attached to the staff at the point H and passes over the pulley D, as seen in the drawing. This weight prevents the staff from slipping back when the latter is used at an angle in picking the fruit. I represents the picking-jaws attached to the end of the staff at one end, and pivoted together at their other end. They are of semicircular form, as seen in Fig. 1, and the flexible tube J is attached to their inner circles, so as to receive the fruit and conduct it down to a basket or other receptacle. On each of the jaws is an arm, K, and to the arms are pivoted the joint-bars L L, which joint-bars are pivoted together and to the rod M, as seen in Fig. 2. The rod M extends along the staff, where it is kept in place by small staples N, and is attached to the thumb-lever O. P is a spring connected with the rod-pivot, as seen at $q$, and to the staff at R. When the rod M is drawn down by pulling the thumb-lever back the arms of the jaws are drawn together and the jaws are closed. When the thumb-lever is released the spring recoils and draws back the rod and opens the jaws.

It will be seen that the picking-staff can be operated by means of the stand without fatigue. It may be turned laterally in either direction and adjusted as to height by altering its angle or by readjusting the bar in the stand.

By this arrangement the objections to the fruit-pickers in use are obviated. A boy may operate my picker, while it is very fatiguing for a strong man to pick fruit with the other.

Having thus described my invention, I claim as new and desire to secure by Letters Patent—

In combination with the staff of a fruit-picker, the adjustable bar C and stand A, substantially as and for the purposes described.

The above specification of my invention signed by me this 2d day of May, 1871.

GEORGE ALDRIDGE.

Witnesses:
   H. S. PARK,
   J. L. ROUSSEAU.